(12) United States Patent
Hessmer et al.

(10) Patent No.: US 8,095,632 B2
(45) Date of Patent: Jan. 10, 2012

(54) METHOD AND SYSTEM FOR PERFORMING REMOTE DIAGNOSTICS ON A PROCESS DATA ACCESS

(75) Inventors: Rainer Hessmer, Rancho Santa Margarita, CA (US); Ivan A. Todorov, Aliso Viejo, CA (US); Michael Hadrich, Munich (DE); Louis D. Ross, Corvallis, OR (US)

(73) Assignee: Invensys Systems, Inc, Foxboro, MA (US)

( * ) Notice: Subject to any disclaimer, the term of this patent is extended or adjusted under 35 U.S.C. 154(b) by 2488 days.

(21) Appl. No.: 09/954,423

(22) Filed: Sep. 14, 2001

(65) Prior Publication Data

US 2002/0112044 A1    Aug. 15, 2002

Related U.S. Application Data

(60) Provisional application No. 60/232,731, filed on Sep. 15, 2000.

(51) Int. Cl.
   *G06F 15/173*    (2006.01)
(52) U.S. Cl. ........... 709/223; 709/224; 715/772; 714/25
(58) Field of Classification Search .................. 709/223, 709/224, 210; 715/772; 714/25; 707/10
   See application file for complete search history.

(56) References Cited

U.S. PATENT DOCUMENTS

| | | | |
|---|---|---|---|
| 5,491,791 A | 2/1996 | Glowny et al. | |
| 5,655,081 A | 8/1997 | Bonnell et al. | |
| 5,812,768 A | 9/1998 | Pagé et al. | |
| 5,822,534 A * | 10/1998 | Yamunachari et al. | 709/224 |
| 5,872,966 A | 2/1999 | Burg | |
| 5,882,534 A * | 3/1999 | Song | 216/12 |
| 5,887,171 A | 3/1999 | Tada et al. | |
| 5,958,012 A | 9/1999 | Battat et al. | |
| 5,987,633 A | 11/1999 | Newman et al. | |
| 6,049,819 A | 4/2000 | Buckle et al. | |
| 6,091,811 A | 7/2000 | Chang et al. | |
| 6,154,778 A | 11/2000 | Koistinen et al. | |

(Continued)

FOREIGN PATENT DOCUMENTS

GB    2 301 717 A    12/1996
(Continued)

OTHER PUBLICATIONS

International Search Report in corresponding PCT Application No. PCT/US01/28951, dated Dec. 31, 2001.
International Search Report in corresponding PCT Application No. PCT/US01/28955, dated Dec. 6, 2001.
International Search Report in corresponding PCT Application No. PCT/US01/28949, dated Dec. 14, 2001.

(Continued)

*Primary Examiner* — Tammy Nguyen
(74) *Attorney, Agent, or Firm* — Edward S Jarmolowicz

(57) ABSTRACT

Disclosed are diagnostic utilities and complimentary interfaces that enable users to observe, from a remote location, the configuration and operation of data access servers and associated data source devices. The servers provide diagnostic data and server-specific diagnostic schema used by a diagnostic utility to analyze the received diagnostic data. Engines within servers supply data associated with diagnostic roots within each server. In an embodiment, the set of diagnostic root types is extensible. First, the diagnostic roots are extended by adding to the scope of data items provided by base diagnostic objects. Second, entirely new diagnostic object root types can be added for a particular server. A diagnostic utility development environment provides a set of class libraries for creating server-specific portions. Server developers use a class library to create customized diagnostic objects. The class library supports both pushing data to the diagnostic utility and serving requests from the diagnostic utility.

19 Claims, 8 Drawing Sheets

U.S. PATENT DOCUMENTS

| | | | |
|---|---|---|---|
| 6,192,364 B1 | 2/2001 | Baclawski | |
| 6,314,422 B1 * | 11/2001 | Barker et al. | 1/1 |
| 6,317,786 B1 * | 11/2001 | Yamane et al. | 709/224 |
| 6,330,008 B1 * | 12/2001 | Razdow et al. | 715/772 |
| 6,449,739 B1 * | 9/2002 | Landan | 714/47 |
| 6,658,598 B1 * | 12/2003 | Sullivan | 714/25 |
| 6,732,170 B2 * | 5/2004 | Miyake et al. | 709/223 |
| 6,785,723 B1 * | 8/2004 | Genty et al. | 709/224 |

FOREIGN PATENT DOCUMENTS

| | | |
|---|---|---|
| WO | PCT/US98/17622 A1 | 9/2000 |

OTHER PUBLICATIONS

Supplementary European Search Report dated Aug. 27, 2009 for EP 01973072.

* cited by examiner

Attach Diag. Utility to DAS

DAS Diag Client - Refresh List View Event

DAS Diag Client - Remove diag objects

DAS Diag Client - Server Shutdown Event

METHOD AND SYSTEM FOR PERFORMING REMOTE DIAGNOSTICS ON A PROCESS DATA ACCESS

CROSS REFERENCE TO RELATED APPLICATION

This application claims priority of Todorov et al. U.S. provisional application Ser. No. 60/232,731, filed on Sep. 15, 2000, entitled "Remote Multiple Client Protocol Support," the contents of which are expressly incorporated herein by reference in their entirety including the contents and teachings of any references contained therein.

FIELD OF THE INVENTION

The present invention generally relates to the field of computerized process control networks. More particularly, the present invention relates to diagnostic utilities that access server components within process control networks to extract information regarding the operational status of the server components. An example of such a server component is a data access server system that supports access by supervisory level client applications to process control information.

BACKGROUND OF THE INVENTION

Significant advances in industrial process control technology have vastly improved all aspects of factory and plant operation. Before the introduction of today's modem industrial process control systems, industrial processes were operated/controlled by humans and rudimentary mechanical controls. As a consequence, the complexity and degree of control over a process was limited by the speed with which one or more people could ascertain a present status of various process state variables, compare the current status to a desired operating level, calculate a corrective action (if needed), and implement a change to a control point to affect a change to a state variable.

Improvements to process control technology have enabled vastly larger and more complex industrial processes to be controlled via programmed control processors. Control processors execute control programs that read process status variables and execute control algorithms based upon the status variable data and desired set point information to render output values for the control points in industrial processes. Such control processors and programs support a substantially self-running industrial process (once set points are established).

Notwithstanding the ability of industrial processes to operate under the control of programmed process controllers at previously established set points without intervention, supervisory control and monitoring of control processors and their associated processes are desirable. Such oversight is provided by both humans and higher-level control programs at an application/human interface layer of a multilevel process control network. Such oversight is generally desired to verify proper execution of the controlled process under the lower-level process controllers and to configure the set points of the controlled process.

Data access servers facilitate placing process control data within reach of a variety of higher-level monitoring/control client applications. During the course of operation, process controllers generate status and control information concerning associated processes. The controllers' process status and control information is stored within process control databases and/or distributed to a number of locations within the process control network. Other process information is generated/stored within field devices (e.g., intelligent transmitters) having digital data communication capabilities. The process information is retrieved from the databases and field devices by data servers for further processing/use by the process control system. For example, the data access servers provide the retrieved information to a variety of client applications providing high-level control and monitoring (both human and computerized) services.

In systems containing data access servers, the high-level control and monitoring applications rely upon the proper operation of the data access servers to provide the data upon which such applications rely for decision-making. Such information includes real-time process variable values, alarms, etc. If a data access server is providing inaccurate or outdated information, then the decision-making process of the high-level control and monitoring applications becomes corrupt. It is therefore important to quickly identify and address malfunctioning data sources such as the data access servers and/or the lower-level devices and control processors that feed process control data to the data access servers.

Many data access servers operate in complex process control computing environments in a time-critical manner. In very large systems, with hundreds, or even thousands, of data access servers spread across hundreds or thousands of computers in many buildings, the cost of tuning the operation of running data access servers and the devices from which they receive their data grows exponentially with the number of such servers. The delay in completing tuning operations also increases. Such delays are costly to manufacturers. Therefore, manufacturers generally seek to minimize the delays encountered when tuning the operation of a data access server and its associated process control devices.

Moreover, it is important to quickly identify and remedy operation faults in an industrial/manufacturing process managed by a process control system. A data access server that is malfunctioning or unable to function because a physical device connected to it is malfunctioning can result in significant downtime for a manufacturing process. In many applications, if the information or control pathway provided by a data access server is unavailable, whole production lines can be brought to a standstill.

SUMMARY OF THE INVENTION

The present invention offers a new way to monitor data access servers and the field equipment with which the data access servers are associated, and with whom the data access servers communicate to render data concerning the present state of a manufacturing and process control network. More particularly, the present invention comprises a manufacturing process utility (and methods performed thereby) that facilitates performance of diagnostic analysis of a remote data access server and its associated process control system information sources. The manufacturing process utility includes a server agent that initially facilitates discovery of a remote data access server to enable the creation of a communication interface with the remote data access server and to thereafter receive diagnostic data from the remote data access server. A remote data access server node includes a diagnostic rules storage for storing diagnostic information regarding the data access server. The diagnostic information includes both status information and diagnostic data hierarchy definitions to guide presentation of the status information for the data access server. The diagnostic utility further comprises a diagnostic tool for presenting the status information in view of the diagnostic data hierarchy.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

DETAILED DESCRIPTION OF AN ILLUSTRATIVE EMBODIMENT

Figure 1:
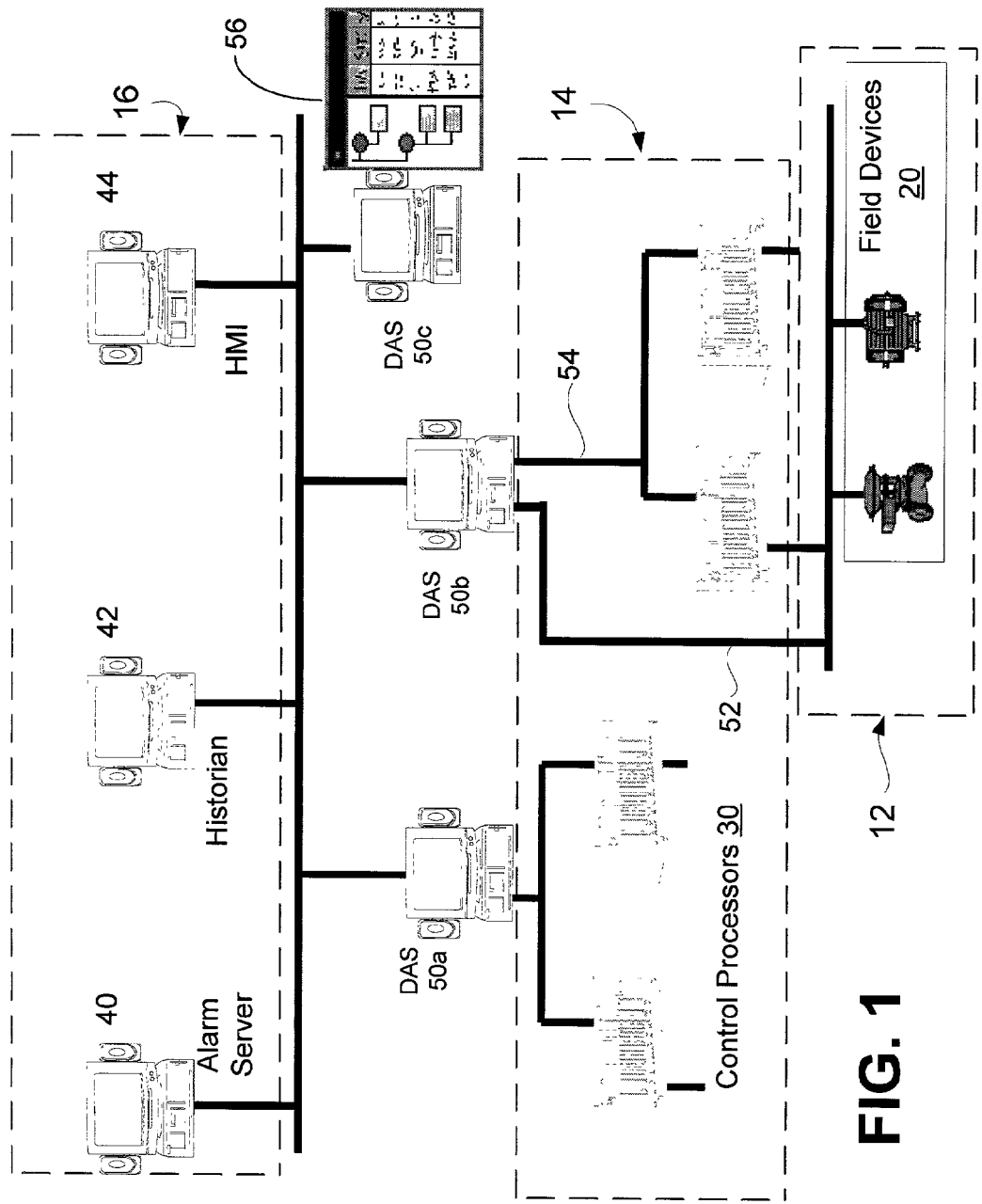
FIG. 1 is a schematic drawing depicting an exemplary process control environment for the present invention wherein a process data access server includes a remote diagnostic utility that retrieves diagnostic information within other data access servers that, in turn, retrieve/receive process control information and provide such information to a variety of client applications residing at a monitoring/supervisory layer of a process control network.

The remote diagnostic utilities and complimentary interfaces incorporated into data access server systems incorporating the present invention enable users to observe, from a single remote location, information representing the configuration and operation status of data access servers and the manufacturing/process control devices with which they are associated. By possessing the capability to discover, from a remote location, runtime details regarding the data access servers and their associated data sources, users are better able to diagnose problems and tune performance of the data access servers and the physical devices (e.g., control processors and field devices) communicatively coupled to the observed data access servers. In an embodiment of the present invention, such runtime details include, but are not limited to: (1) the number of data items managed by the data access server and which items are combined in each message; (2) the message scheduling and arbitration strategy utilized by the data access server—e.g., which messages will become due when; (3) individual item values, as presented, for example, in accordance with a device bus protocol; and (4) exceptional conditions reported by the bus protocol (e.g., a device is off scan) that prevent data from being read or written.

The ability to extract such runtime information from remote data access servers enables an administrator (human or computerized process) to monitor, from a single location, the health of data access servers within a potentially very large process control system. Such capability enables dramatic reduction in the time and cost of diagnosing data access server-related problems since the information that forms the basis for diagnostic procedures carried out by the administrator is made available to maintenance personnel on demand and at a single location. In systems embodying the present supervisory control remote diagnostics, maintenance personnel do not have to physically travel to a malfunctioning data access server or field equipment until the problem has been sensed through the remote diagnostics and linked to some physical component. It is noted that the tests performed by the diagnostic utility on remote data access servers can also be applied to the node containing the diagnostic utility.

The disclosed exemplary remote diagnostic utility includes a set of features/characteristics that, in combination, are particularly useful in a manufacturing/process control network environment containing multiple data access servers. As will be explained further herein below the diagnostic utility incorporates an extensible architecture allowing customized extensions to a base set of capabilities. The diagnostic utility includes a generic diagnostic tool that examines diagnostic information from a plurality of different implementations of data access servers. The data access servers provide both diagnostic data as well as a source data access server-specific diagnostic schema used by the diagnostic utility to analyze the received diagnostic data.

Furthermore, in an embodiment of the invention the diagnostic tool utilizes DAS (data access server) agents located on remote data access servers to enumerate the data access servers running on each remote node in the network and to thereafter connect to the data access servers for purposes of extracting diagnostic data. After connecting, an engine within a data access server supplies data associated with diagnostic roots within each data access server. The engines support a base set of diagnostic roots (data item types), and no further programming is required to expose such diagnostic details to the diagnostic utility. Thus, no data access server-specific code need be supported.

In an embodiment of the invention, the set of diagnostic root types is extensible. In the case of extensions to the base set of diagnostics, the engines are augmentable by developers of the data access servers. Such extensions are, by way of example, new types of diagnostic roots. Alternatively, the extensions are in the form of additional data items associated with diagnostic root types. Such additional data items are displayed through added columns in a graphical user interface supported by the diagnostic utility.

After receiving diagnostic data, the diagnostic utility presents a view of the discovered data access servers and their associated extracted configuration/runtime diagnostic data. The diagnostic data sources provide, along with their data, schema information enabling the diagnostic utility to properly organize and display the obtained information upon a graphical user interface.

A valuable feature of an embodiment of the present invention is its extensibility with regard to expanding the diagnostic information provided by data access servers through the base set of diagnostic roots supported initially for an installed data access server. First, the diagnostic roots are extended by adding to the scope of data items provided by a base diagnostic object (root). This extension corresponds to adding a column/field of data to the information provided for a particular diagnostic object/root. Second, entirely new diagnostic object/root types can be added for a particular server. These extensions are supported by a server-specific part of the programming for data access servers. To facilitate easy extension of the base diagnostics, the diagnostic utility development environment provides data access server developers a set of class libraries comprising templates for creating server-specific portions. The server developers use a class library to create customized diagnostic objects. These objects incorporate a set of customizable methods that a developer adapts to enable a particular data access server to generate additional diagnostic information or even to create a new diagnostic object type. The class library object incorporates base methods dealing with the details of delivering the selected additional information to the diagnostic utility. The class library supports both pushing data to the diagnostic utility and serving requests from the diagnostic utility.

Turning initially to FIG. 1, an exemplary portion of a process control network is illustratively depicted. As previously mentioned, the present invention is useful in any network including a data access server. However, the value of performing remote diagnostics on data access servers increases with increases in the number of data access servers and the distance between monitoring stations and data access servers within a manufacturing/process control network. The process control network can be viewed as a set of devices connected to one or more network links associated with particular levels of the process control network. In the exemplary embodiment, the depicted portion of the process control network includes a fieldbus level 12, a local control level 14, and a supervisory control level 16. Though the exemplary embodiment is depicted as having three levels, those skilled in the art will readily appreciate the applicability of the present invention to a number of process control network architectures having more, less, or the same number of network levels. The illustratively depicted network embodies a multi-level bus topology. However, the present invention can be incorporated into process control networks embodying alternative network topologies (e.g., star networks, hybrid bus/star networks, etc.) including both single-level and hierarchical configurations.

In the exemplary portion of a process control network depicted in FIG. 1, a set of intelligent field devices 20 reside at the fieldbus level 12. The field devices include intelligent process variable transmitters that sense pressure, temperature, fluid flow, etc., in a controlled industrial process. The field devices also include actuators such as those enabling opening and closing fluid flow valves for tanks, burners, etc.

Control processors 30 at the local control level 14 perform local control functions with regard to the set of intelligent field devices 20. The control processors 30 receive process state information provided by the intelligent field devices 20. State information includes, for example, pressure, temperature, mass flow, volumetric flow, etc. The control processors apply the received status information to a set desired points for the process and then transmit control signals to actuators in order to obtain or maintain the desired set points. The control processors are programmed/configured to store the status and control information associated with their control function.

The supervisory control level 16 includes higher level control applications programs that facilitate and/or implement enterprise/plant level decision making and supervisory (e.g., set point) control value designation functions. An alarm server 40 receives process status data from a number of lower level sources, including both the control processors 30 and the field devices 20. The alarm server 40 compares the received status data against a set of alarm/event conditions and issues appropriate notifications to either monitors or control processes (e.g., control processors 30) in response to a detected alarm/event condition. The control processors 30 issue appropriate signals to controlled field devices/actuators to address the event/alarm condition. A historian 42, also operating at the supervisory control level 16, archives data received from any of the aforementioned levels of the process control system. Such data is available for auditing and verification by a variety of application programs. A human-machine interface (HMI) 44 is yet another node connected to the supervisory control level 16. The human-machine interface 44 provides a set of graphic/text user interface functions enabling a human to view the operation/status of the controlled process associated with the process control system with which the depicted items of FIG. 1 are associated.

In an exemplary embodiment of the present invention, a set of data access server nodes 50a, 50b, and 50c are interposed between the supervisory control level 16's processing nodes and the lower levels of the process control system (e.g., the local control level 14 and fieldbus level 12). The data access server node 50b, executing one or more logical DA servers, receives and/or extracts data from the field devices 20 (via channel 52) and/or the control processors 30 (via channel 54) and provides corresponding (possibly reformatted) data to processing nodes at the supervisory control level 16 of the process control network—including one or more of the nodes executing one of the other data access servers. The data access server nodes 50a-c perform the task of providing data to a variety of client applications that obtain data in accordance with particular data exchange protocols and are otherwise unable to access process control data provided at the local control level 14 and fieldbus level 12. A method and system for supporting multiple client data exchange protocols is described in Todorov et al. U.S. patent application (number not yet assigned), filed on Sep. 14, 2001, and entitled "An Industrial Process Control Data Access Server Supporting Multiple Client Data Exchange Protocols," which is incorporated herein by reference in its entirety including any references therein.

A diagnostic utility executed upon the data access server 50c (indicated in FIG. 1 by a two paned window 56 including a graphical root structure and displayed columns), upon any of the other data access servers, or upon any supervisory-level 16 node, provides a means for remotely monitoring process control system data access servers. In an embodiment of the invention, the data access server diagnostic utility is an application that executes upon the same node as a data access server. For example, as depicted in FIG. 1, the diagnostic utility executes upon a data access server node 50c. However, there is no requirement for the diagnostic utility to reside upon any particular type of node (since it executes independently of DAS data acquisition/transmission processes). DAS agents are tools for discovering data access servers on a network. In the illustrative embodiment of the present invention, the diagnostic utility (tool), through DAS agents instantiated on at least nodes 50a and 50b (to query the registry on each of those nodes) discovers the running data access servers running on DAS nodes 50a, 50b, and 50c and presents a list to a user. The user is then able to select one or more of the data access servers of interest to perform diagnostics. Once connections are established between the diagnostic utility running on DAS node 50c and the data access servers, other components within the data access servers take over and handle information requests from the diagnostic utility. Those components are discussed herein below with reference to FIG. 2. It is also noted that in an embodiment of the present invention, the diagnostic utility program is incorporated into a base library included within each of the data access server nodes 50a, 50b, and 50c, and thus there is no need on the part of an administrator to add any special programs or executable code to support the operation of the diagnostic utility within the network.

In the illustrative embodiment set forth in FIG. 1, a processing engine that carries out the core functionality of each DAS node 50a-c hosts the diagnostic utility and exposes a default set of diagnostic information via a set of well-defined interfaces described herein below with reference to FIG. 2. As mentioned herein above, data access server node functionality can be enhanced, through customization of a server-specific part of the DA servers, by extending the scope of diagnostic information provided by the data access servers to the diagnostic utility. Thus, by customizing the data access server, a developer can expose both custom diagnostic roots (see below) as well as provide additional items to a set of items supported by base diagnostic roots.

Furthermore, it is reiterated that the present invention is not limited to any particular process control system network topology or technology. For example, the disclosed exemplary process control network comprises a hierarchically arranged digital system. However, in an alternative network embodiment, the present invention is incorporated within a monitoring node connected to a single-level process control network wherein the field devices, control processor(s), and supervisory control applications constitute nodes on a single bus. In yet other cases, the DAS receives data concerning conventional, analog field devices that utilize the 4-20milli-amp standard for process communications.

Figure 2:
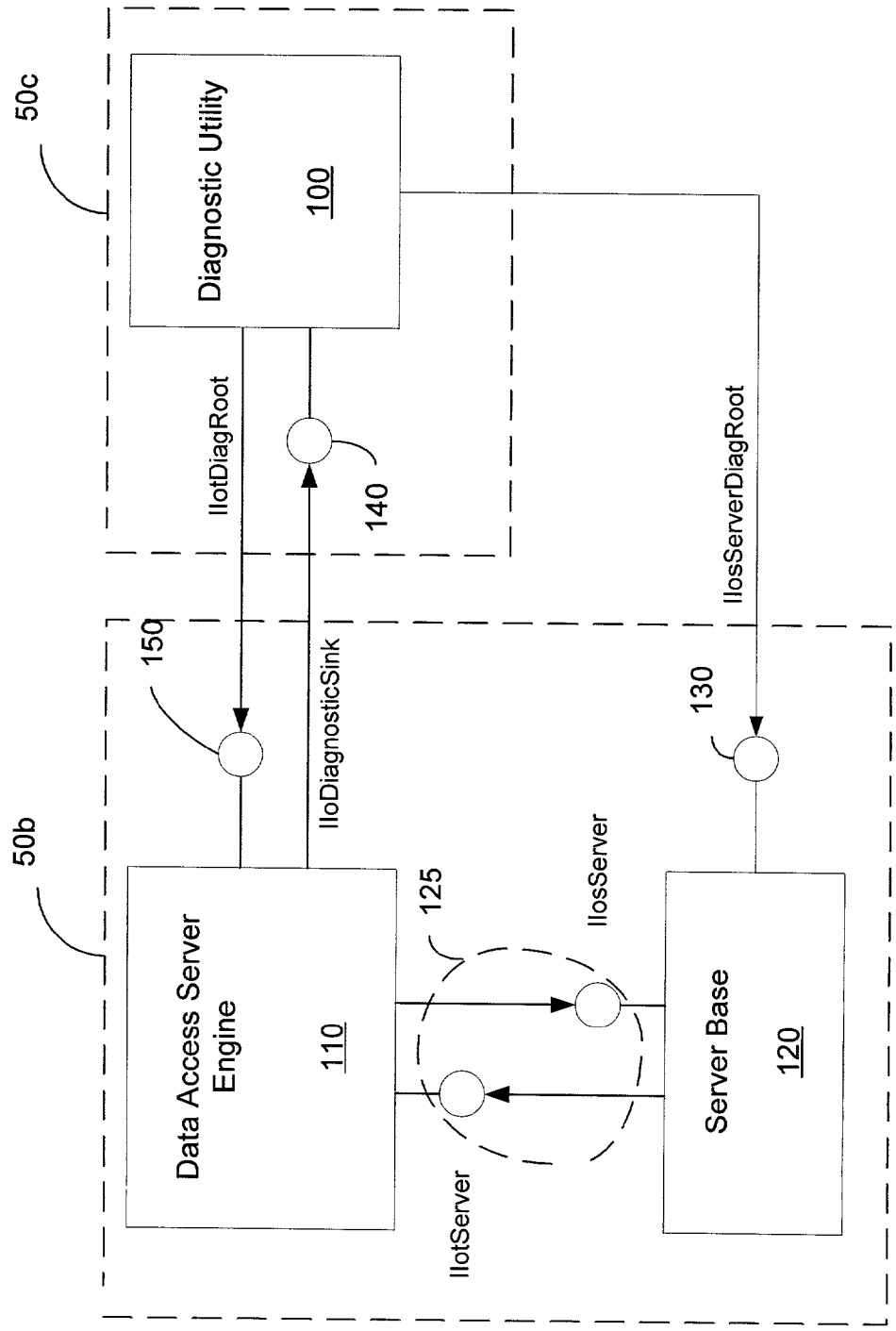
FIG. 2 is a schematic drawing summarizing the general interface arrangement for an exemplary data access server arrangement embodying the present invention.

Turning to FIG. 2, an interface arrangement for implementing remote diagnostic data extraction via a diagnostic utility installed on the data access server node 50c containing a diagnostic utility 100 is schematically depicted. In an exemplary embodiment of the present invention, the diagnostic utility 100 attaches to a running data access server node using well known COM/DCOM interfaces. Interfaces between the diagnostic utility 100 and a DAS engine 110 on the remote data access server node 50b are preferably generic so that it is not necessary to install software components on a node running the diagnostic utility 100 to accommodate new diagnostic data sources. An additional, unidirectional interface is provided between the diagnostic utility 100 and a data access server base 120 to establish a location where the server base 120 can deposit its data. A server engine to server base interface 125 supplies methods described herein below for passing requests and responsive data between the DAS engine 110 and the data access server base 120. Among other things, the server base 120 supports a server-specific part of diagnostic data (i.e., the extensible part of diagnostics supplied by a data access server).

The following is a pseudocode representation of a portion of the interface 125 (referred to herein as IIotServer) provided by the DAS engine 110 in support of calls by the server base 120.

```
interface IIotServer : IUnknown
{
    // Server code passes a diagnostic tool requests to attach.
    HRESULT AttachDiagnostic
    (      // Diagnostic tool passes its callback interface:
        [in]          IIoDiagnosticSink*    pIIoDiagnosticSink,
        // Diagnostic tool wants to limit diagnostics to a hierarchy level:
        [in, string]  LPCWSTR               szHierarchy,
        // Diagnostic node—machine where the DASC is installed
        [in, string]  LPCWSTR               szDiagNode,
        // Diagnostic tool specifies refresh mode (event=true, poll=false):
        [in]          BOOL                  bEventRefresh,
        // Cookie allowing the Client to stop the diagnostic callbacks
        [out]         DWORD*                dwCookie
    );
    // Diagnostic Client disconnect from the client
    HRESULT DetachDiagnostic
    (
        // Cookie allowing the Client to stop the diagnostic callbacks
        [in]          DWORD                 dwCookie
    );
    /*
        Called by ServerBase during C++ constructors for any SvIoDiagLeaf-
        derived object. Creates a TkIoDiagObject object to act as "base object"
        for the SvIoDiagObject customization object.
    */
    HRESULT CreateDiagLeaf
    (
        /*
            IOSHANDLE to the C++ customization object in ServerBase. This
            handle has meaning only to the ServerBase transport object and will
            identify this instance of SvIoDiagObject.
        */
        [in]          CSHANDLE              hCustomize,
        // Safe handle (DAS engine handle) of the parent branch object in the DAS engine
        [in]          CSHANDLE              hParent,
        /*
            Pointer to the IOTHANDLE supplied by the SvIodiagObject customization
            object. This handle will identify its base object, the TkIoDiagObject object
            being created by CreateDiagObject.
```

-continued

```
            */
            [out]       IOTHANDLE*      hTkIoDiagLeaf
);
/*
Called by ServerBase during C++ constructors for any SvIoDiagStatisticsLeaf-
derived object. Creates a TkIoDiagObject object to act as "base object" for the
SvIoDiagObject customization object.
*/
HRESULT CreateDiagStatisticsLeaf
(
            /*
            IOSHANDLE to the C++ customization object in ServerBase. This
            handle has meaning only to the ServerBase transport
            object and will identify this instance of SvIoDiagObject.
            */
            [in]        CSHANDLE        hCustomize,
            /*
            Pointer to the IOTHANDLE supplied by the SvIodiagObject customization
            object. This handle will identify its base object, the TkIoDiagObject
            object being created by CreateDiagObject.
            */
            [out]       IOTHANDLE*      hTkIoDiagStatisticsLeaf
);
//Called by ServerBase during C++ destruction for any SvIoDiagObject-derived object.
HRESULT DeleteDiagLeaf
(
            /*
            IOSHANDLE to the C++ customization object in ServerBase. This
            handle has meaning only to the ServerBase transport object and will
            identify this instance of SvIoDiagObject.
            */
            [in]        IOSHANDLE       hCustomize
);
/*
            Called by ServerBase during C++ constructors for any SvIoDiagBranch-
            derived object. Creates a TkIoDiagBranch object to act as "base object"
            for the SvIoDiagObject customization object.
*/
HRESULT CreateDiagBranch
(
            /*
            IOSHANDLE to the C++ customization object in ServerBase. This
            handle has meaning only to the ServerBase transport object and will
            identify this instance of SvIoDiagBranch.
            */
            [in]        CSHANDLE        hCustomize,
            /*
            Safe handle (DAS engine handle) of the parent branch object in the DAS engine
            */
            [in]        CSHANDLE        hParent,
            /*
            Pointer to the IOTHANDLE supplied by the SvIodiagObject customization
            object. This handle will identify its base object, the TkIoDiagBranch object
            being created by CreateDiagBranch.
            */
            [out]       CSHANDLE*       hTkIoDiagBranch
);
/*
            Called by ServerBase during C++ destruction for any SvIoDiagObject-
            derived object.
*/
HRESULT DeleteDiagBranch
(
            /*
            IOSHANDLE to the C++ customization object in ServerBase. This
            handle has meaning only to the ServerBase transport object and will
            identify this instance of SvIoDiagBranch.
            */
            [in]        IOSHANDLE       hCustomize
);
/*
            Called by ServerBase during C++ constructors for any SvIoDiagRoot-
            derived object. Creates a TkIoDiagRoot object to act as "base object"
            for the SvIoDiagRoot customization object.
*/
HRESULT CreateDiagRoot
(
            /*
            IOSHANDLE to the C++ customization object in ServerBase. This
            handle has meaning only to the ServerBase IIosDiagRoot transport
```

```
                object and will identify this instance of SvIoDiagRoot.
        */
        [in]        IOSHANDLE       hCustomize,
        /*
                Pointer to the IOTHANDLE supplied by the SvIodiagRoot customization
                object. This handle will identify its base object, the TkIoDiagRoot
                object being created by CreateDiagRoot.
        */
        [out]       IOTHANDLE*      hTkIoDiagRoot
);
/*
        Called by ServerBase during C++ destruction for any SvIoDiagRoot-
        derived object.
*/
HRESULT DeleteDiagRoot
(
        /*
                IOSHANDLE to the C++ customization object in ServerBase. This
                handle has meaning only to the ServerBase IIosDiagRoot transport
                object and will identify this instance of SvIoDiagRoot.
        */
        [in]        IOSHANDLE       hCustomize
);
// Called by the server to add a diagnostic object.
HRESULT AddObjectToDiagnostics
(
        // IOTHANDLE of the base object in the DAS engine
        [in]        IOTHANDLE       hCustomize,
        /*
                Boolean flag advises the DAS engine to update immediately or to
                wait until the next PushDiagnosticObjects call.
        */
        [in]        BOOL            bUpdateClient
);
// Called by the server to remove a diagnostic object
HRESULT RemoveObjectFromDiagnostics
(
        // IOTHANDLE of the base object in the DAS engine
        [in]        IOTHANDLE       hCustomize,
        /*
                Boolean flag advises the DAS engine to update immediately or to
                wait until the next PushDiagnosticObjects call.
        */
        [in]        BOOL            bUpdateClient
);
//Called by the server to push an accumulated diagnostic object add/remove list
HRESULT PushDiagnosticObjects ();
};
```

The generic interface operations supporting the diagnostic utility 100 to DAS engine 110 communications preferably supply requests and responsive diagnostic data at sufficient throughput rates to support live monitoring of data access servers that are remote from the diagnostic tool and are thus accessed over a network. The functional requirements for acquiring and processing diagnostic data access server data are met, for example, by methods/operations meeting the interface definitions described herein below. Those skilled in the art will readily appreciate the wide variety of ways in which the below-defined functional requirements are met by systems embodying the present invention.

An IIosServerDiagRoot interface 130 is a global diagnostic interface providing a point of run-time attachment for the diagnostic tool 100 to a data access server base 120 from which diagnostic data is extracted (by the DAS engine 110). The IIosServerDiagRoot interface 130, the root interface of the server base 120, exposes the following two methods: AttachDiagnostic and ShutDown. In AttachDiagnostic the diagnostic utility 100 passes a pointer to the diagnostic utility 100's own diagnostic sink callback interface, the refresh mode, and the locale ID (identifying a country for purposes of selecting a language for a user of the diagnostic utility) for the diagnostic output from the DAS engine 110 to the diagnostic utility 100. The Shutdown operation notifies the server base that the previously provided callback interface is no longer active. In an embodiment of the invention, options are specified to customize the shutdown operation. The following is a pseudocode representation of the IIosServerDiagRoot interface 130.

```
interface IIosServerDiagRoot : IDispatch
{
        /* The server base provides the root for the diagnostic interfaces: */
        HRESULT AttachDiagnostic
        (
                /*
                Attaches the diagnostic client to the server by passing the callback interface. The
```

```
            client must be prepared to receive and handle callbacks on this interface.
        */
        [in]        IDispatch*          pIIoDiagnosticSink,
        /*
            Only pass the string of the hierarchy level (fully qualified name) if the
            diagnostic client is interested in a particular hierarchy object. Pass an empty
            string if the whole server is diagnosed.
        */
        [in]        BSTR                Hierarchy,
        /*
            The server can set the initial state of update handling:
                bEventRefresh = false   diagnostic client polls diagnostic live data
                                        regularly
                bEventRefresh = true    server informs diagnostic client about
                                        changes to trigger update.
            To reduce bandwidth and CPU load on diagnosing many fast changing items
            values the default mode is:
                bEventRefresh = false
            to poll only on regular time intervals independent of data changes.
        */
        [in]        boolean             bEventRefresh
        /* Sets the locale ID for all future diagnostic output for this client in this session */
        [in]        LONG                localeID
    );
    HRESULT ShutDown
    (
        /*
            Options parameter is currently not used but a set of options can customize the
            shutdown of a diagnostic.
        */
        [in]        LONG                Options;
    );
};
```

An IIoDiagnosticSink interface 140 is provided by the diagnostic tool as a callback interface for the DAS engine 110. As DAS events occur (e.g., creation of diagnostic roots and diagnostic objects by the DAS), the diagnostic utility 100 is notified by the DAS engine 110 of the DAS events through the IIoDiagnosticSink interface 140. The IIoDiagnosticSink interface 140 exposes the following methods: SetHeader, AddDiagRoot, AddDiagObjects, RemoveDiagObjects, UpdateEvent, and OnShutDown. The following is a commented pseudocode representation of the IIoDiagnosticSink interface 140.

```
interface IIoDiagnosticSink: IDispatch
{
    /*
        The server sets the column headers in the list view of the diagnostic client.
        The diagnostic client should do the following in this method:
            1. delete the list view contents
            2. delete all column headers
            3. create a new colunm header for each sub-string.
    */
    HRESULT SetHeader
    (
        /*
            The string contains tab-separated substrings. Each substring represents the
            header of a list view column.
        */
        [in]        BSTR                DiagHeader
    );
    /*
        The server adds a diagnostic root element to the tree view of the diagnostic client.
        Each diagnostic root object is identified by a CSHANDLE. The diagnostic client should
        save these.
        The diagnostic client should make no assumptions on the nature/syntax of a diagnostic
        root object.
    */
    HRESULT AddDiagRoot
    (
        /* Diagnostic root interface of the server/core toolkit */
        [in]        IDispatch*          pIIotDiagRoot,
        /* Diagnostic root safe handle */
        [in]        LONG                hRoot,
```

```
        /* Icon index of the icon to display for this node in the tree view */
        [in]         LONG                iconno,
        /* Root object name to be displayed in the tree view */
        [in]         BSTR                szRootString
    );
    /*
        The server adds diagnostic child elements to an existing diagnostic node.
        The child elements can be branches/nodes and/or leaves. Leaves only appear in
        the list view. Branches always appear in the tree view. They also appear in the
        list view when the parent object is selected.
    */
    HRESULT AddDiagObjects
    (
        /* Safe handle of the parent branch */
        [in]         LONG                hParentBranch,
        /* Flags: currently only the bit for full or incremental update is defined. */
        [in]         DWORD               Options,
        /*
            Leaf header. The client needs to use the leaf header only if the corresponding list
            view for this parent branch has not been created yet.
        */
        [in]         BSTR                LeafHeader,
        /* Branch handle safe array */
        [in]         SAFEARRAY(LONG)     hBranchArray,
        /* Icon index array for all branch objects */
        [in]         SAFEARRAY(LONG)     IconIndexArray,
        /* Branch strings safe array */
        [in]         SAFEARRAY(BSTR)     DiagBranchStringArray,
        /* Leaf handle safe array */
        [in]         SAFEARRAY(LONG)     hLeafArray,
        /* Leaf strings safe array */
        [in]         SAFEARRAY(BSTR)     DiagLeafStringArray,
    );
    /* The server removes diagnostic child elements. */
    HRESULT RemoveDiagObjects
    (
        /* Parent safe handle */
        [in]         LONG                hParent,
        /* Branch handle safe array */
        [in]         SAFEARRAY(LONG)     hBranchArray,
        /* Leaf handle safe array */
        [in]         SAFEARRAY(LONG)     hLeafArray,
    );
    /* The server informs the client to update the specified branches. */
    HRESULT UpdateEvent
    (
        /* Handle array of all branches that changed */
        [in]         SAFEARRAY(LONG)     hBranchArray,
        /*
            Options: currently only the flags VALUE_UPDATE and OBJECT_UPDATE
            are supported.
        */
        [in]         SAFEARRAY(LONG)     hBranchArray,
    );
    /*
        The server informs the diagnostic client that it is going to shut down.
        The client should release all references to all server interfaces immediately
        and remove the server from the diagnostic view.
    */
    HRESULT OnShutDown
    (
        /* Options parameter is currently not used. */
        [in]         LONG                Options;
    );
};
```

An IIotDiagRoot interface 150 exposes diagnostic contexts, or "diagnostic roots," established within the DAS engine 110. Diagnostic roots include, for example, the following: structure (hierarchical view), client groups (OPC groups), device groups, transactions, statistics, messages, and any of an extensible set of server-specific diagnostic roots implemented by a server developer. An exemplary default set of diagnostic root types is explained herein below with reference to FIG. 3. The IIotDiagRoot interface 150 exposes the following methods: AddDiagObjects, GetLeafDiagnostics, GetLeafInfo, QueryLeafForceKeys, and ForceValues. The following is a commented pseudocode representation of the IIotDiagRoot interface 150.

```
interface IIotDiagRoot : IDispatch
{
    /*
        The diagnostic client instructs the server to add all diagnostic objects (child branches and
        child leaves) to the specified node.
    */
    HRESULT AddDiagObjects
    (
        /*
            Safe handle of the parent branch (use ROOT_CSHANDLE =
            INVALID_CSHANDLE for root objects)
        */
        [in]        LONG                    hParentBranch
    );
    /*
        The diagnostic client retrieves diagnostic information about all visible leaf objects in the
        list view.
    */
    HRESULT GetLeafDiagnostics
    (
        /* Handle array of all visible leaves */
        [in]        SAFEARRAY(LONG)         hLeafArray,
        /*
            Diagnostic string array of all requested leaves. These strings are tab-
            separated substrings. Each substring represents the entry in the
            corresponding column.
            All strings are returned in the same order as the leaf array.
        */
        [out]       SAFEARRAY(BSTR)*        DiagLeafStringArray
    );
    /*
        The diagnostic client retrieves detailed diagnostic information about a leaf that the user
        selected.
    */
    HRESULT GetLeafInfo
    (
        /* Handle of the requested leaf */
        [in]        LONG                    hLeaf,
        /* Info string returned from the server */
        [out]       BSTR*                   LeafInfo
        /* Key array for diagnostic keys */
        [out]       SAFEARRAY(BSTR)*        DiagLeafStringArray
    );
    /* The diagnostic client queries available force keys of a leaf that the user selected. */
    HRESULT QueryLeafForceKeys
    (
        /* Handle of the requested leaf */
        [in]        LONG                    hLeaf,
        /* Array of available keys for this leaf */
        [out]       SAFEARRAY(LONG)*        KeyArray,
        /* Array of data types for the keys */
        [out]       SAFEARRAY(LONG)*        DataType,
        /*
            Array of headers for the keys. The diagnostic client will display this
            string preceding the edit field of the corresponding force value.
        */
        [out]       SAFEARRAY(BSTR)*        HeaderArray,
        /*
            Array of units for the keys. The diagnostic client will display this
            string following the edit field of the corresponding force value.
        */
        [out]       SAFEARRAY(BSTR)*        UnitArray,
    );
    /* The diagnostic client forces values by key. */
    HRESULT ForceValues
    (
        /* Handle of the leaf to be forced */
        [in]        LONG                    hLeaf,
        /*
```

```
                Array of keys to be forced. This is a subset of the available keys returned
                in QueryLeafForceKeys.
            */
            [in]        SAFEARRAY(LONG)      KeyArray,
            /* Array of values for the keys */
            [in]        SAFEARRAY(VARIANT)   Values
        );
};
```

Figure 3:
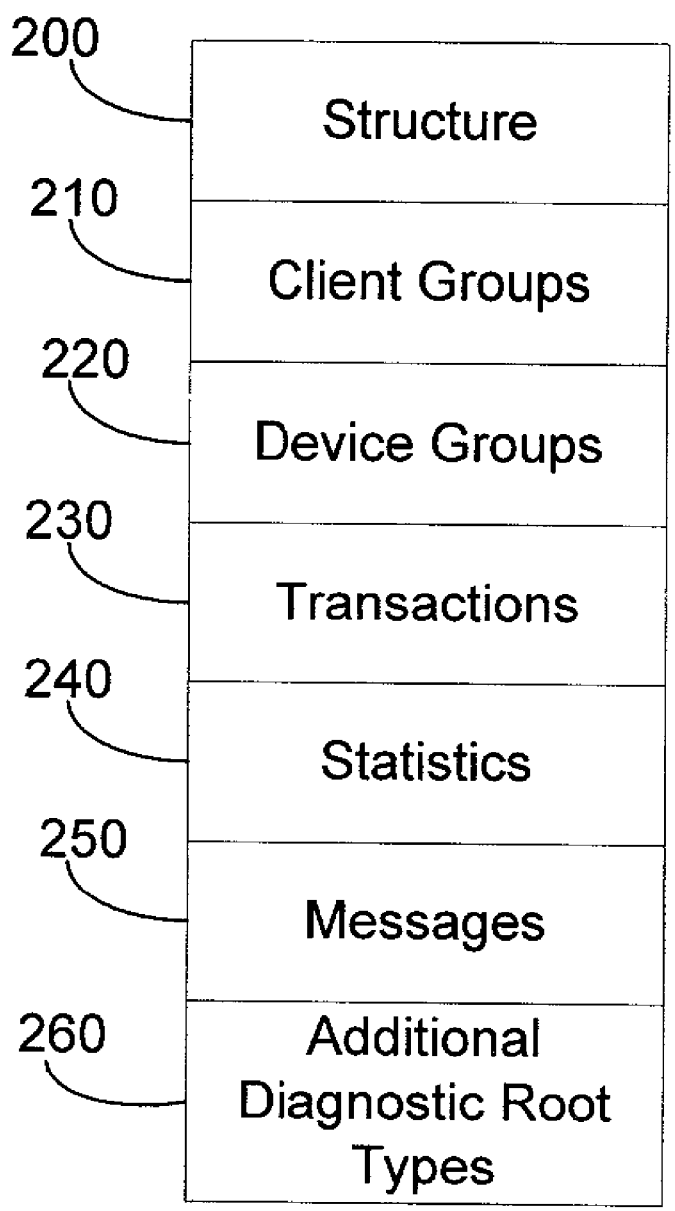
FIG. 3 depicts an exemplary set of diagnostic root types supported by default by a data access server engine in accordance with an exemplary embodiment of the present invention.

Having described a set of exemplary interfaces between the diagnostic utility 100 (executing, for example, upon the DAS 50c), the DAS engine 110, and the server base 120 of a communicatively linked data access server (e.g., DAS 50b), attention is now directed to FIG. 3 that identifies a set of exemplary diagnostic root types previously identified above with reference to the set of IIotDiagRoot interfaces 150. The set of diagnostic roots identified in FIG. 3 comprise a set of default diagnostic root types that are defined in a base data access server engine software package for a manufacturing/process control system.

A structure diagnostic root type 200 supports a hierarchical view of the physical devices, as configured for the data access server supplying an instance of this type of diagnostic root. The structure diagnostic root type 200 supports identification of ports, boards, and busses connected to routers, PLCs, and other physical devices. When received and processed by the diagnostic utility 100, each device identified in the structure root is graphically displayed in the hierarchical position it occupies in a current configuration of the diagnostic utility 100.

Each client creates "client groups" and then adds items (data references) to the client groups. A client groups diagnostic root type 210 supports providing a flat list of all client groups as currently created from an aggregate of all clients of the data access server. For each identified client group diagnostic root of the client groups diagnostic root type 210, all items currently associated with that group are listed, along with their individual VTQs (value, timestamp, quality).

Every item added to a client group also specifies a device group as an attribute. Device groups are configured for the data access server and specify the device update interval for items in the device group. A device group diagnostic root type 220 supports providing a flat list of all device groups, as configured for the data access server. For each device group within the flat list of device groups, all items currently added to the device group are listed along with their individual VTQs.

Clients may request that a specific list of items be read or written directly to their devices. These requests are called transactions. Transactions are scheduled to merge into the background subscription bus traffic and therefore are not processed instantaneously. A transactions diagnostic root type 230 supports creating transaction roots for providing a flat list of all transactions in the order they are scheduled and indicating their completion status.

A statistics diagnostic root type 240 supports creating transaction roots that specify a collection of overall load control statistics, such as messages per second processed for a specific device. The data access server developer customizes the statistics diagnostic root type 240 by writing code for additional columns of data access server-specific information.

Messages are collections of items managed by the DAS engine. In a manner similar to the transactions diagnostic root type 230, a messages diagnostic root type 250 supports creation of a message diagnostic root containing a flat list of messages and statistics associated with the set of messages. Such statistics include the number of messages pending and active and the number of items in each message.

The above identified six diagnostic root types are exposed and managed by the DAS engine 110 on behalf of a running data access server. The diagnostic utility 100 includes built-in core functionality for generically receiving and depicting the diagnostic data provided within diagnostic roots of the above-identified types as well as new diagnostic root types created by developers as an extension of the default set. The diagnostic information exposed by an individual data access server is extensible in either or both of two ways through the writing and integration of additional software. First, the data access server code can be written to expose more diagnostic roots types 260 (in addition to the six above-described default types). Any information that is specific to a particular data access server, and not available to the DAS engine generically, is added in this manner.

In a preferred embodiment of the present invention, a graphical user interface associated with the diagnostic utility 100 presents a two paned user-interface window. The left pane contains a tree structure with expandable-contractable nodes. Some of the default diagnostic roots present diagnostic information in the right pane in a columnar format. A second manner in which the functionality of the proposed remote data access server diagnostic utility is extended is to add to a set of default columns specified for particular diagnostic roots types. The default columns are supported by the DAS engine 110. A server developer writes diagnostic root code adding to default columns specified for a particular diagnostic root type.

Thus, the above-described set of root types is extensible to include server-specific customized diagnostic root types that augment the default set of diagnostic root types as well as add more information to the information provided within any of the default diagnostic root types. The following provides a class library description/definition that facilitates customizing diagnostic root sets on a data access server.

With regard to extending diagnostic roots to include additional data holders (or columns in the displayed output for an accessed root), all server side diagnosable diagnostic objects derive from an SvIoDiagObject base class object. In an embodiment of the invention, when a server developer customizes a provided behavior of an existing object (like items, hierarchies, device groups/topics, and messages) the developer overwrites the virtual methods: CreateDiagString(..) and CreateDiagInfo(..) for the default diagnostic root object definition. CreateDiagString returns the tab-separated additional column information of the corresponding object and CreateDiagInfo returns the diagnostic info string, which is called when the user double clicks the diagnostic line. If the server developer does not overwrite these methods or does not derive objects from the base classes, the default diagnostic information with the columns and information provided by the DAS engine 110 is used.

```
Class SvIoDiagObject
// All Server-side diagnosable objects derive ultimately from SvIoDiagObject. //
Class SvIoDiagObject : public SvIoObject
{
    friend class SvIoItem;
    friend class SvIoHierarchy;
    friend class SvIoTopic;
    friend class SvIoMessage;
    friend class CIosItem;
    public:
        ///////////////////////////////////////////////////////////
        //Constructor, Destructor
        ///////////////////////////////////////////////////////////
        SvIoDiagObject();
        virtual ~SvIoDiagObject();
    //Accessors
    public:
        virtual    LPWSTR   CreateDiagString(LCID lcid);
        virtual    LPWSTR   CreateDiagInfo(LCID lcid);
    private:
        protected:
};
```

The header string information is supplied via virtual methods on the server level, providing the initial column sizes and options along with the header corresponding to a given locale ID:

```
virtual LPWSTR CreateHierarchyDiagHeader
(
    /* [in] */      LCID        lcid,
    /* [out] */     DWORD*      pnColumns,
    /* [out] */     LONG**      ppColumnSize,
    /* [out] */     LONG**      ppColumnOptions
);
virtual LPWSTR CreateItemDiagHeader
(
    /* [in] */      LCID        lcid,
    /* [out] */     DWORD*      pnColumns,
    /* [out] */     LONG**      ppColumnSize,
    /* [out] */     LONG**      ppColumnOptions
);
virtual LPWSTR CreateMessageDiagHeader
(
    /* [in] */      LCID        lcid,
    /* [out] */     DWORD*      pnColumns,
    /* [out] */     LONG**      ppColumnSize,
    /* [out] */     LONG**      ppColumnOptions
);
virtual LPWSTR CreateTopicDiagHeader
(
    /* [in] */      LCID        lcid,
    /* [out] */     DWORD*      pnColumns,
    /* [out] */     LONG**      ppColumnSize,
    /* [out] */     LONG**      ppColumnOptions
);
```

With regard to extending the set of diagnostic roots by adding completely new diagnostic roots, the server developer creates new diagnostic roots and populates them with diagnostic objects. This augmentation is accomplished by overwriting a virtual method called CreateDiagnosticRoots on the server object (e.g., virtual bool CreateDiagnosticRoots (void)). The server developer overwrites this function by implementing the instantiation of SvIoDiagRoot-derived objects. Roots and branches have the virtual method of adding diagnostic objects:

```
class SvIoDiagBranch : public SvIoDiagCsObject
{
    public:
        ...
        virtual bool AddDiagObjects(LCID lcid);
        ...
}
```

In the method below, the server developer adds branches and leaves. These branches and leaves provide the same mechanism for diagnostics as the default objects with customized columns, except that the full diagnostic string is supplied by the server and not only the additional diagnostic columns:

```
class SvIoDiagBranch : public SvIoDiagCsObject
{
    public:
        ...
        virtual LPWSTR CreateDiagStringEx(LCID lcid);
        virtual LPWSTR CreateDiagInfoEx(LCID lcid);
        ...
}
```

Figure 4:
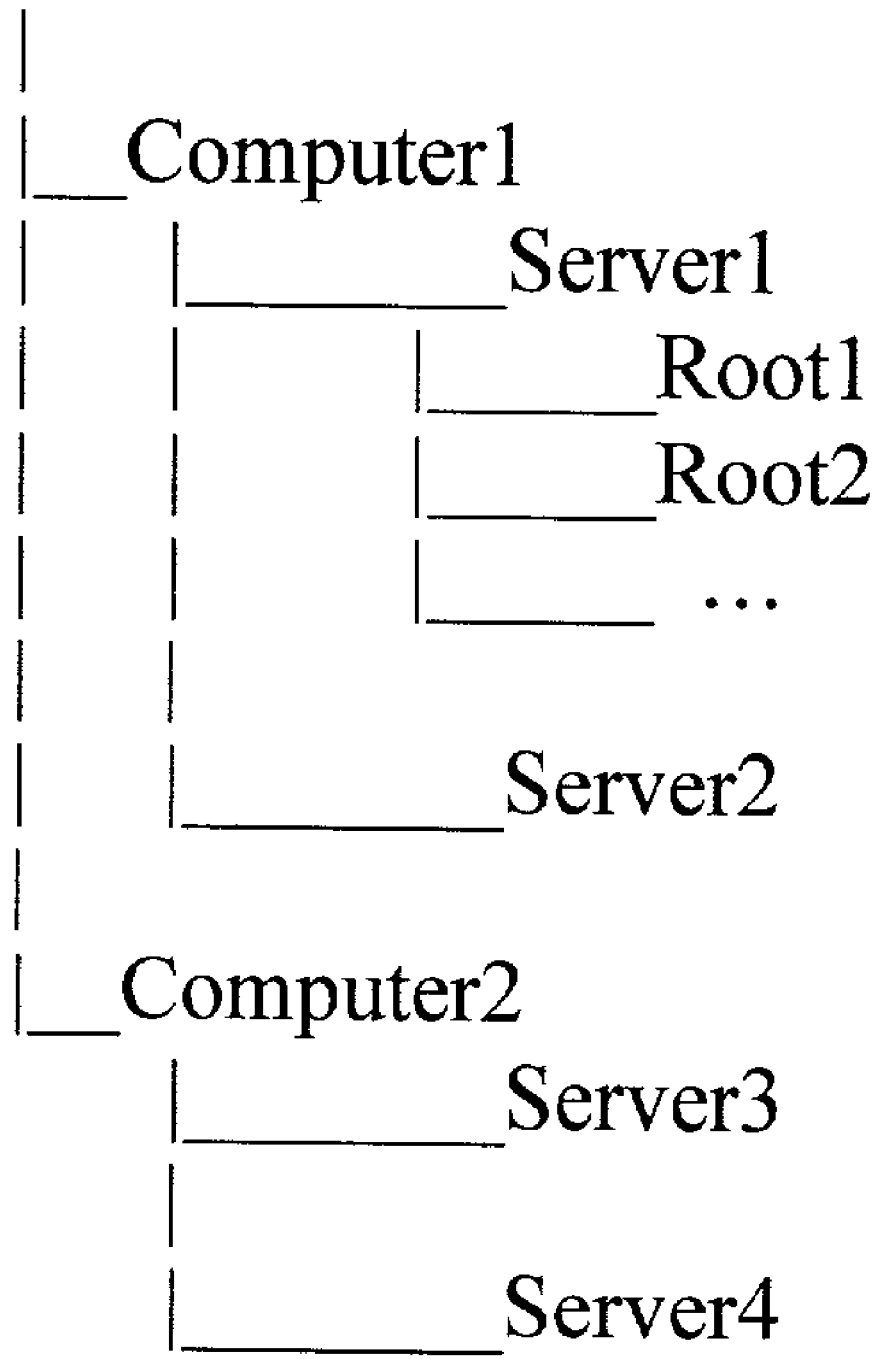
FIG. 4 is a diagram of an exemplary structure of diagnostic roots and their associated containers.

In an embodiment of the invention, the diagnostic utility supports creating a graphical image in the form of a window comprising two side-by-side panes. A tree structure diagram, having structures similar to the depicted structure of FIG. 4 is depicted in the left pane of the graphical user interface associated with the diagnostic utility 100. The exemplary root structure graphically depicts hierarchical internal relationships of an exemplary set of diagnostic roots defined for multiple (4) data access servers executing upon two distinct computer nodes in a manufacturing/process control network. A right pane (not depicted) depicts diagnostic information associated with a particular node selected in the left pane. The diagnostic utility, when active, queries all running data access servers on a network and obtains the diagnostic roots associated with each of such data access servers. In an embodiment, when the user launches the diagnostic utility (a selectable executable on a network computer node), the diagnostic utility examines the network nodes and discovers the data access servers executing upon the network nodes. Upon establishing a connection to logical data access server instances running on the network nodes and obtaining the diagnostic root structures and related diagnostic data, the diagnostic utility presents, in its left pane, the diagnostic data sources and their containers in the form of a hierarchical structure view (depicted, by way of example, in FIG. 4). When a user selects one of the depicted nodes of the depicted root structure, the diagnostic utility presents data related to the node, and currently possessed by the diagnostic utility, within the right side pane of the graphical user interface. Network 300 corresponds to the manufacturing/process control application. Each computer node with one or more running data access servers is presented as the top level of the hierarchical tree. The computer nodes, designated Computer1 and Computer2, correspond to the physical nodes upon which identified logical data access server instances reside. Beneath each computer node, the logical data access servers comprise a next lower level on the depicted diagnostic hierarchy. The logical data access server instances are identified in FIG. 4 as Server1, Server2, Server3, and Server4. The association between Server1 and Server2 with Computer1 and Server3 and Server 4 with Computer2 is graphically depicted. Available diagnostic roots are depicted with connections to their associated logical servers and comprise a third level of the depicted diagnostic hierarchy. A root is depicted, by way of example, for each diagnostic root associated with a particular logical data access server. Different diagnostic roots potentially have any of a variety of different internal structures. Although the diagram in FIG. 4 indicates that the hierarchy stops at the diagnostic roots, it may continue for additional levels below the roots based upon the diagnostic root design. The structure depicted in FIG. 4, and its associated functionality (selectability of elements to expose lower levels and their associated information), provides ready access to a broad spectrum of diagnostic data via a graphical user interface.

Figure 5:
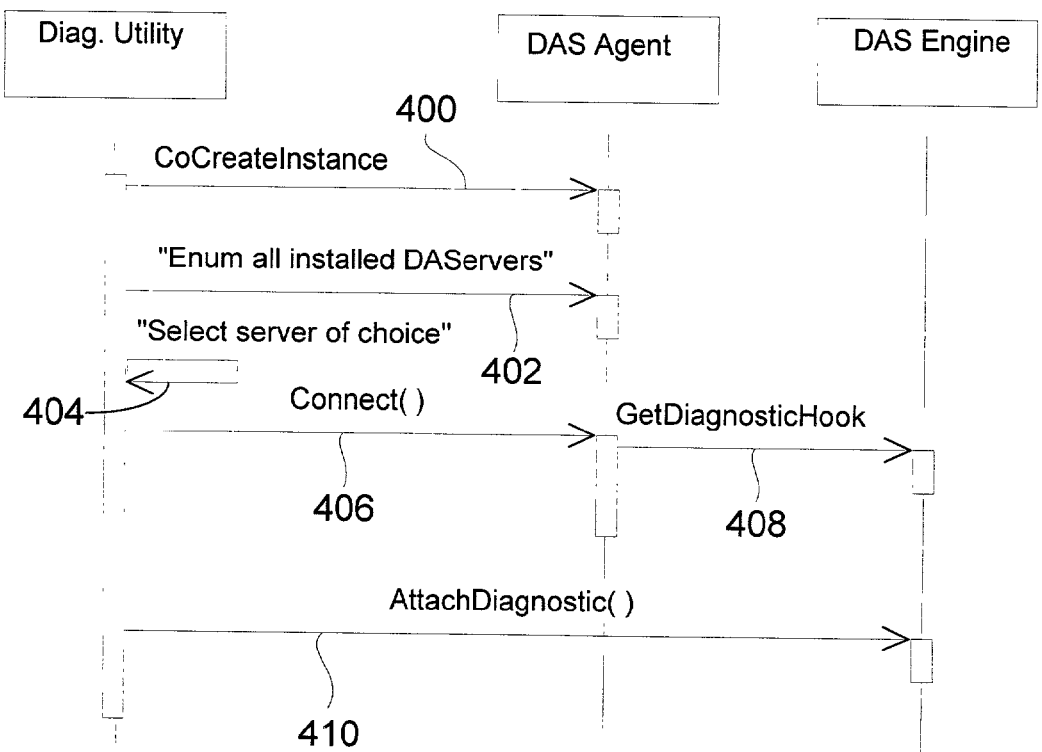
FIG. 5 is a sequence diagram summarizing an exemplary set of steps for creating a connection between a selected data access server and a requesting diagnostic utility.

Turning now to FIG. 5, a sequence diagram summarizes an exemplary set of steps for establishing an initial connection between the diagnostic utility 100 and a data access server. During step 400, the diagnostic utility requests one or more remote DAS nodes on the network to create an instance of a DAS agent. Next, during step 402, the diagnostic utility requests the DAS agents to query their respective nodes and return responses identifying instantiated data access servers on their respective nodes. The DAS agents thereafter return information identifying each of the DAS servers. In an embodiment of the invention, a tree graphical user interface depicts a set of nodes and their associated data access server instances.

Thereafter, a user selects from the set of returned data access server identifications a particular data access server during step 404. Next, at step 406 the diagnostic utility transmits a request to the DAS agent corresponding to a selected DA server. The request seeks establishment of a connection between the diagnostic utility and the indicated data access server. At step 408, the DAS agent calls a corresponding data access server engine running on the DAS agent's node to obtain an interface destination of the DAS engine corresponding to the selected DA server instance. After receiving the destination information, during step 410 the diagnostic utility issues an AttachDiagnostic( ) which attaches the diagnostic utility's diagnostic sink interface to the DAS engine that creates a data access server-specific connection between the diagnostic utility and the DAS engine on behalf of the selected data access server instance. Thereafter, the DAS engine notifies the diagnostic utility of the types of information available for the selected data access server.

Figure 6:
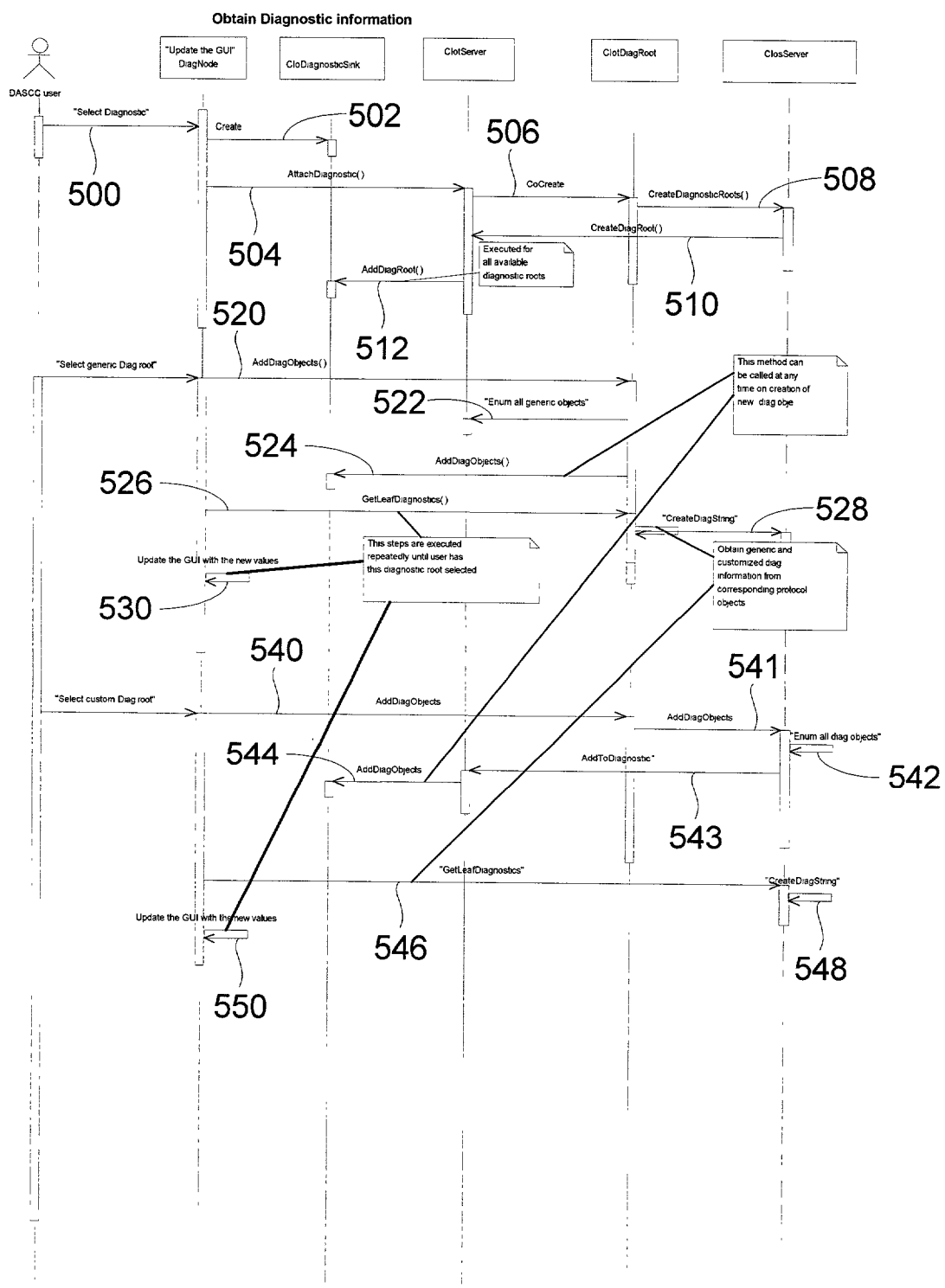
FIG. 6 is a sequence diagram summarizing an exemplary sequence of steps for a diagnostic utility obtaining diagnostic information from a remote data access server.

Turning to FIG. 6, a set of primary steps are summarized for a diagnostic client obtaining diagnostic parameter values provided by a set of diagnostic roots defined for a selected data access server. As those skilled in the art will readily appreciate, the identified steps are intended to describe the general flow of requests for information rather than set forth every single step performed to complete an operation. During step 500 a user selects the diagnostic utility program. Next, at step 502 the diagnostic utility initially creates an instance of a diagnostic sink object for receiving diagnostic information from data access servers. In summary of the attachment creation process described in FIG. 5, the diagnostic utility calls an identified data access server engine to attach the server engine to the diagnostic sink of the diagnostic utility during step 504. In response the server engine (CIotServer) issues a call during step 506 to create a diagnostic root interface object (CIotDiagRoot) to serve requests from the diagnostic utility. A CIotDiagRoot object is instantiated for each diagnostic utility client to manage the diagnostic objects and diagnostic states. In turn, the diagnostic root interface object, during step 508, calls the customized data access server component (CIosServer) for the data access server to create diagnostic roots. CIosServer during step 510 calls the server engine (CIotServer) with a call for the server engine to create diagnostic roots corresponding to the server-specific root information provided by the server-specific part of the data access server. During step 512 the server engine compiles the complete set of diagnostic roots associated with the selected data access server and returns this set in a callback to the diagnostic utility's diagnostic sink for the selected data access server. At this point, the user is able to select the roots of interest from a tree structure similar to the one depicted in FIG. 4 and to have corresponding diagnostics displayed on a second (right-hand) pane of the diagnostic utility's graphical user interface.

In the case where a user selects a default diagnostic root at step 520, the diagnostic utility issues an "AddDiagObjects" call to the diagnostic root object created by the DAS engine call during step 506. In response, during step 522 the called diagnostic root object returns a set of objects associated with that particular root. Furthermore, as depicted at step 524, once a diagnostic root object is created, it can issue an AddDiagnosticObjects call on creation of new diagnostic objects.

Often, a diagnostic root itself contains additional levels of diagnostic root objects. The diagnostic utility, during step 526, issues a GetLeafDiagnostics call to the diagnostic root object to obtain all leaves associated with the diagnostic root object. Step 526 occurs each time that a user selects a root that itself contains lower-level root diagnostic objects. During step 528 the diagnostic root object obtains root information from corresponding protocol objects containing diagnostic data and potentially calls the customized server component to obtain root data corresponding to a customized root object. During step 530, the graphical user interface of the diagnostic utility is updated in accordance with the root data returned by the server engine via the diagnostic sink interface.

On the other hand, a user can select a customized diagnostic root. In that case, during step 540, the diagnostic utility issues an "AddDiagObjects" call to the diagnostic root object created by the DAS engine call during step 506. In response, during step 541 the called diagnostic root object passes the AddDiagObjects call to the customized server component. In response, during step 542 it assembles a set of all diagnostic objects associated with the specified diagnostic root. During step 543 the customized server component issues an AddToDiagnostics call to the server engine that returns a set of objects associated with that particular root. Furthermore, as depicted in step 544, the server engine can issue an AddDiagObjects call on creation of new diagnostic objects corresponding to the root.

Often, a diagnostic root itself contains additional levels of diagnostic root objects. The diagnostic utility, during step 546, issues a GetLeafDiagnostics call to the diagnostic root object to obtain all leaves associated with the diagnostic root object. Step 546 occurs each time that a user selects a root that itself contains lower-level root diagnostic objects. During step 548 the customized server component obtains root information from corresponding protocol objects containing diagnostic data. During step 550, the graphical user interface of the diagnostic utility is updated in accordance with the root data returned by the server engine via the diagnostic sink interface.

Figure 7:
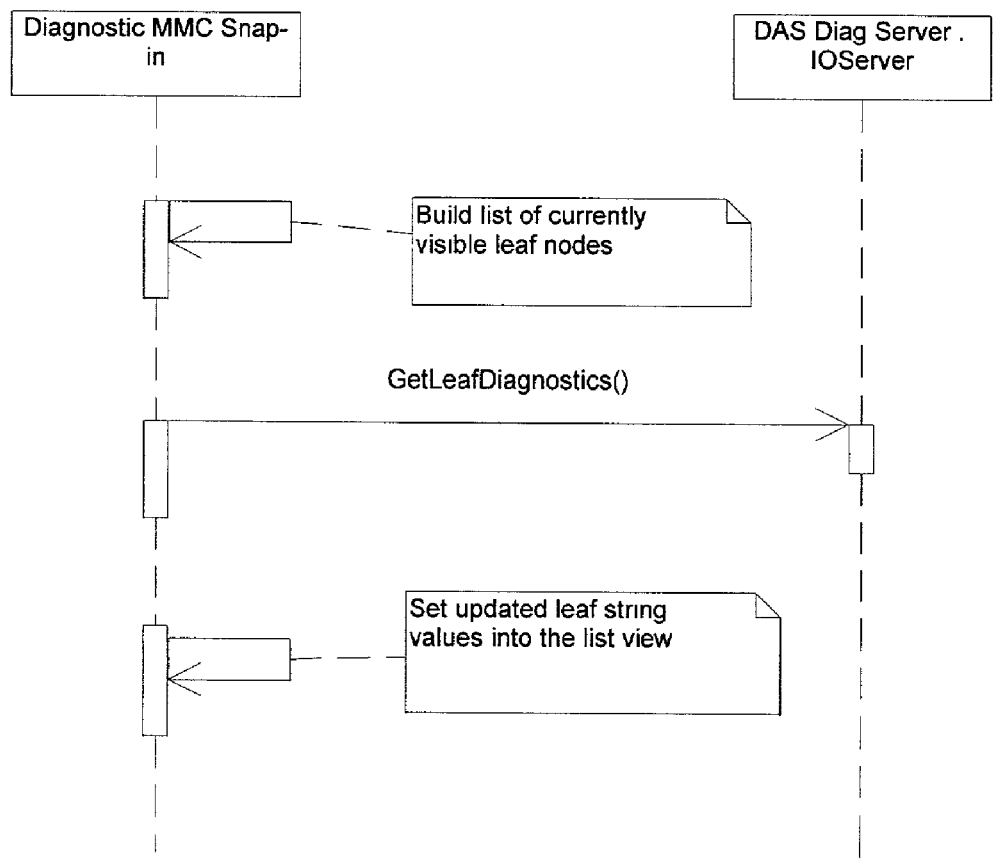
FIG. 7 is a sequence diagram summarizing an exemplary sequence of steps for refreshing a list view for a particular selected leaf on a diagnostic tree.
Figure 8:
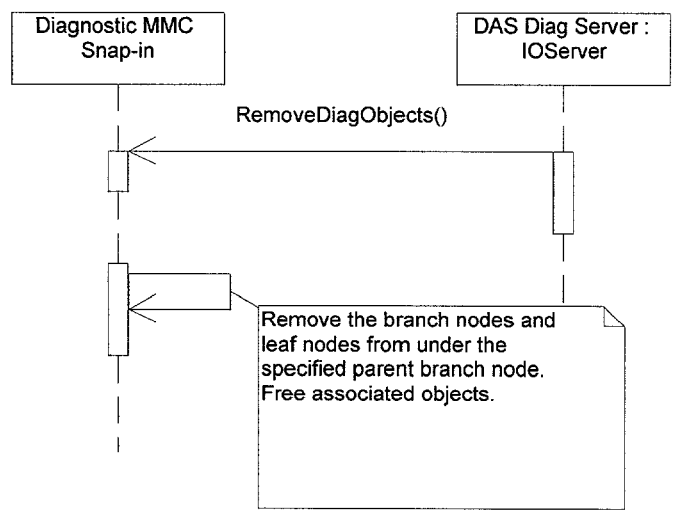
FIG. 8 is a sequence diagram summarizing an exemplary sequence of steps performed by a data access server and diagnostic utility to remove one or more diagnostic objects from a system.
Figure 9:
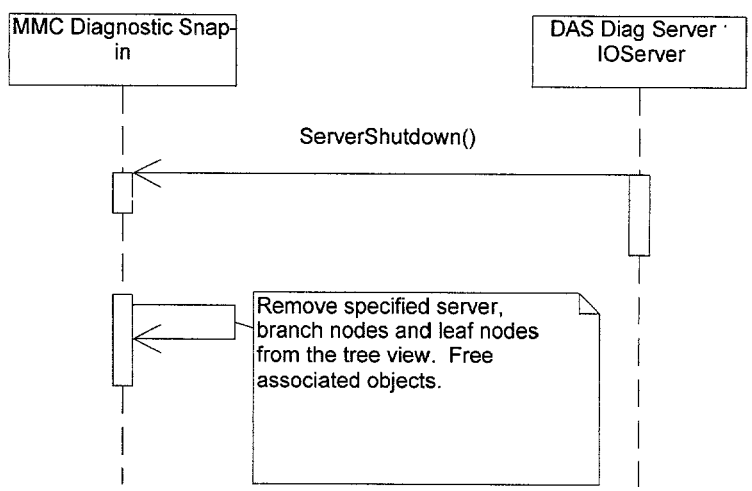
FIG. 9 is a sequence diagram summarizing an exemplary sequence of steps for a shutdown procedure initiated by a data access server.

The remaining figures are intended to depict exemplary operations performed once a diagnostic utility establishes a connection with a data access server engine for a particular data access server instance. FIG. 7 depicts a sequence of steps that utilize previously described interface methods to refresh a list view of a selected diagnostic leaf. FIG. 8 summarizes an exemplary set of steps for removing a diagnostic object previously selected by a user. FIG. 9 summarizes a set of steps for shutting down remote diagnostics for a particular data access server instance.

Illustrative embodiments of the present invention and certain variations thereof have been provided in the Figures and accompanying written description. The present invention is not intended to be limited to these embodiments. Rather, the present invention is intended to cover the disclosed embodiments as well as others falling within the scope and spirit of the invention to the fullest extent permitted in view of this disclosure and the inventions defined by the claims appended herein below.

What is claimed is:

1. A manufacturing process utility, distributed across multiple networked nodes and facilitating performance of diagnostics on a data access server from a remote network location, the manufacturing process utility comprising:
   a diagnostic tool;
   a server agent, located on a remote processing node remote from the diagnostic tool, for:
   facilitating discovery of a remote data access server on the remote processing node by querying the remote processing node and returning a response identifying the remote data access server on the remote processing node, and
   facilitating establishing a connection between the diagnostic tool, residing on a node distinct from the remote processing node, and the remote data access server to provide diagnostic information regarding the remote data access server to the diagnostic tool;
   a diagnostic roots storage, maintained on the remote processing node, for storing diagnostic information regarding the data access server, the diagnostic information including both status information and diagnostic data schema information to guide presentation, by the diagnostic tool, of the status information for the data access server;
   wherein the diagnostic tool displays the status information in view of the diagnostic data schema information; and
   wherein the data access server provides diagnostic data associated with particular information contexts supported by the data access server.

2. The manufacturing process utility of claim 1 wherein the diagnostic tool displays server-specific diagnostic data presented according to server-specific diagnostic display instructions provided by a server-specific part for the data access server.

3. The manufacturing process utility of claim 1 wherein the diagnostic tool supports extension of a set of diagnostic information to include server-specific information.

4. The manufacturing process utility of claim 1 wherein the manufacturing process utility supports designation of built-in error handling parameters at each level in a control hierarchy.

5. The manufacturing process utility of claim 1 wherein the process utility generically processes all input diagnostic data from a variety of differing data access servers.

6. The manufacturing process utility of claim 1, wherein the data access server supports a structure information context for specifying a hierarchical view of physical devices.

7. The manufacturing process utility of claim 1, wherein the data access server supports a client groups information context for specifying a list of all clients of the data access server.

8. The manufacturing process utility of claim 1, wherein the data access server supports a device groups information context for specifying a list of all devices configured for the data access server.

9. The manufacturing process utility of claim 1, wherein the data access server supports a transactions information context for specifying transactions associated with the data access server, including completion status of each enumerated transaction.

10. The manufacturing process utility of claim 1, wherein the data access server supports a statistics information context for specifying load control statistics.

11. The manufacturing process utility of claim 1, wherein the data access server supports a messages information context for specifying a list of messages and associated statistics.

12. The manufacturing process utility of claim 1, wherein the set of supported information contexts is extensible to include new information contexts.

13. The manufacturing process utility of claim 1, wherein a supported information context is extensible to add data placeholders to an existing information context.

14. A method for performing, by a manufacturing process utility distributed across multiple networked nodes and including a diagnostic tool, diagnostics on a data access server from a remote network location, the method comprising:
   discovering, by a server agent located on a remote processing node remote from the diagnostic tool, a remote data access server located on the remote processing node by querying the remote processing node and returning a response identifying the remote data access server on the remote processing node;
   establishing a connection between the diagnostic tool, residing on a node distinct from the remote processing node, and the remote data access server to provide diagnostic information regarding the remote data access server to the diagnostic tool;
   storing, by a diagnostic roots storage on the remote processing node, diagnostic information regarding the data access server, the diagnostic information including both status information and diagnostic data schema information to guide presentation, by the diagnostic tool, of the status information for the data access server;
   displaying, by the diagnostic tool, the status information in view of the diagnostic data schema information; and
   wherein the data access server provides diagnostic data associated with particular information contexts supported by the data access server.

15. The method of claim 14 wherein the displaying step comprises displaying diagnostic information according to a hierarchical structure depicting individual data access servers and a set of information contexts under the data access servers.

16. The method of claim 14 wherein the connection comprises a data sink interface for receiving diagnostic information from the data access server.

17. The method of claim 14 further comprising providing, by the data access server: a server-specific type of diagnostic information, and a server-specific diagnostic schema facilitating processing the server-specific type of diagnostic information.

18. The method of claim 14 further comprising displaying, by the diagnostic tool, a set of data access servers discovered by the server agent.

19. A computer readable medium including computer executable instructions facilitating performing, by a manufacturing process utility distributed across multiple networked nodes and including a diagnostic tool, diagnostics on a data access server from a remote network location, the computer executable instructions facilitating performing the steps of:

discovering, by a server agent located on a remote processing node remote from the diagnostic tool, a remote data access server located on the remote processing node by querying the remote processing node and returning a response identifying the remote data access server on the remote processing node;

establishing a connection between the diagnostic tool, residing on a node distinct from the remote processing node, and the remote data access server to provide diagnostic information regarding the remote data access server to the diagnostic tool;

storing, by a diagnostic roots storage on the remote processing node, diagnostic information regarding the data access server, the diagnostic information including both status information and diagnostic data schema information to guide presentation, by the diagnostic tool, of the status information for the data access server;

displaying, by the diagnostic tool, the status information in view of the diagnostic data schema information; and wherein the data access server provides diagnostic data associated with particular information contexts supported by the data access server.

* * * * *